US007900886B2

(12) United States Patent
Manubolu et al.

(10) Patent No.: US 7,900,886 B2
(45) Date of Patent: Mar. 8, 2011

(54) VALVE ASSEMBLY HAVING A WASHER

(75) Inventors: Avinash Reddy Manubolu, Edwards, IL (US); Stephen Robert Lewis, Chillicothe, IL (US); Daniel Richard Ibrahim, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 335 days.

(21) Appl. No.: 12/081,644

(22) Filed: Apr. 18, 2008

(65) Prior Publication Data

US 2009/0261286 A1 Oct. 22, 2009

(51) Int. Cl.
*F16K 31/02* (2006.01)

(52) U.S. Cl. .................................................. 251/129.16

(58) Field of Classification Search ............. 251/129.16, 251/129.18, 214; 239/585.1–585.4
See application file for complete search history.

(56) References Cited

U.S. PATENT DOCUMENTS 2,179,684 A * 11/1939 Brown .......................... 251/163
2,530,128 A 11/1950 Mashinter
2,761,647 A 9/1956 Zeck
4,408,579 A 10/1983 Kusche
5,024,418 A 6/1991 Reinicke et al.
5,582,153 A * 12/1996 Dutt et al. ..................... 123/450
6,161,813 A * 12/2000 Baumgartner et al. ......... 251/50
2003/0178593 A1* 9/2003 Grytz ....................... 251/129.16
2009/0127356 A1* 5/2009 Junger et al. ............... 239/585.1

FOREIGN PATENT DOCUMENTS

JP 09209874 A 8/1997
JP 11082241 A 3/1999
SE 445763 7/1986

* cited by examiner

*Primary Examiner* — John K Fristoe, Jr.
*Assistant Examiner* — Marina Tiet Jen
(74) *Attorney, Agent, or Firm* — Finnegan, Henderson, Farabow, Garrett & Dunner LLP

(57) ABSTRACT

A valve assembly is disclosed. The valve assembly has a housing having a first recess disposed on an interior surface of the housing and at least one valve-supporting element disposed within the housing. The valve assembly also has a washer disposed within the housing, the washer having a first washer surface and a projection for transferring torque. The first washer surface abuts against a first valve-supporting element surface of the at least one valve-supporting element and the projection is received in the first recess. The valve assembly also has a first fastener disposed within the housing and having a first fastener surface abutting against a second washer surface of the washer.

18 Claims, 3 Drawing Sheets

VALVE ASSEMBLY HAVING A WASHER

TECHNICAL FIELD

The present disclosure is directed to a valve assembly and, more particularly, to a valve assembly having a washer.

BACKGROUND

Some engines such as, for example, diesel engines, rely on compression ignition, where fuel is injected into a combustion chamber after air has been compressed to cause substantially immediate combustion without requiring a sparkplug. Compression ignition engines typically include a common rail fuel injection system, directing pressurized fuel to individual fuel injectors for injection into the combustion chamber. The fuel injector may include a needle check valve assembly reciprocatingly disposed within a cylindrical bore. To inject fuel, the needle check valve assembly may be selectively moved to open a nozzle outlet, thereby allowing high pressure fuel to spray from a nozzle supply passageway into the associated combustion chamber. The needle check valve assembly is typically secured within the fuel injector by a load screw.

A significant amount of torque may be applied to the load screw to adequately secure the valve assembly within the fuel injector. However, the clearances associated with the valve assembly may be extremely small, e.g., on the order of micrometers. The torque required to secure the valve assembly may be large enough to cause a misalignment of the valve assembly components, resulting in malfunction or damage to the valve assembly. A common industry practice is to use lubricants on the valve assembly to prevent misalignment during torquing, but these lubricants may mix with fuel during operation of the fuel injector, which may lead to improper engine operation.

One attempt at providing a valve assembly that addresses these shortcomings is described in U.S. Pat. No. 2,530,128 (the ’128 patent) issued to Mashinter. The ’128 patent discloses a fuel injector for supplying fuel to a cylinder of an internal combustion engine. Fuel is supplied from an external fuel source under pressure to a first reservoir within the fuel injector. The ’128 patent discloses a ball and spring assembly to control the flow of fuel from the first reservoir to a second reservoir. The second reservoir has a valve assembly configured to provide fuel to a combustion chamber. The ’128 patent discloses that a washer having a tab may help secure the spring within the fuel injector.

Although the fuel injector of the ’128 patent may provide a method for providing fuel to a combustion chamber, it may fail to prevent and/or reduce misalignment of a fuel injector when a screw is tightened to secure a valve assembly within a fuel injector.

The present disclosure is directed to overcoming one or more of the shortcomings set forth above.

SUMMARY OF THE DISCLOSURE

In accordance with one aspect, the present disclosure is directed toward a valve assembly. The valve assembly includes a housing having a first recess disposed on an interior surface of the housing and at least one valve-supporting element disposed within the housing. The valve assembly also includes a washer disposed within the housing, the washer having a first washer surface and a projection for transferring torque. The first washer surface abuts against a first valve-supporting element surface of the at least one valve-supporting element and the projection is received in the first recess. The valve assembly also includes a first fastener disposed within the housing and having a first fastener surface abutting against a second washer surface of the washer.

According to another aspect, the present disclosure is directed toward a method for assembling a fuel injector. The method includes inserting at least one plate into a body of the fuel injector and inserting a washer having a tab into the body. The method also includes selectively engaging a first surface of the washer with a first surface of the at least one plate and inserting the tab into a recess disposed on an interior surface of the body. The method further includes selectively threading a screw into threads disposed on the interior surface to selectively urge the at least one plate against an end wall of the body. The method also includes selectively transferring torque from the screw to the body by selectively engaging the tab with a surface of the recess.

DETAILED DESCRIPTION

A machine such as, for example, a mobile machine that performs some type of operation associated with an industry such as mining, construction, farming, power generation, or transportation, may include an engine such as, for example, a four-stroke diesel engine or a gaseous fuel-powered engine. The engine may be a compression ignition engine and may include an engine block that at least partially defines a plurality of cylinders, a piston slidably disposed within each cylinder, and a cylinder head associated with each cylinder. The cylinder, piston, and cylinder head may form a combustion chamber.

The machine may also include a fuel system for delivering fuel to the engine. An exemplary fuel system may include components that cooperate to deliver injections of pressurized fuel into each combustion chamber. The fuel system may include a common rail fuel injection system for directing pressurized fuel to individual fuel injectors for injection into the combustion chamber. The fuel system may include a tank configured to hold a supply of fuel, and a fuel pumping arrangement configured to pressurize the fuel and direct the pressurized fuel to a plurality of fuel injectors 50, shown in FIG. 1, by way of a common rail. Fuel injectors 50 may be disposed within the cylinder heads and may be fluidly connected to the common rail by a plurality of distribution lines. Each fuel injector 50 may be operable to inject an amount of pressurized fuel into an associated combustion chamber at predetermined timings, fuel pressures, and fuel flow rates.

Figure 1:
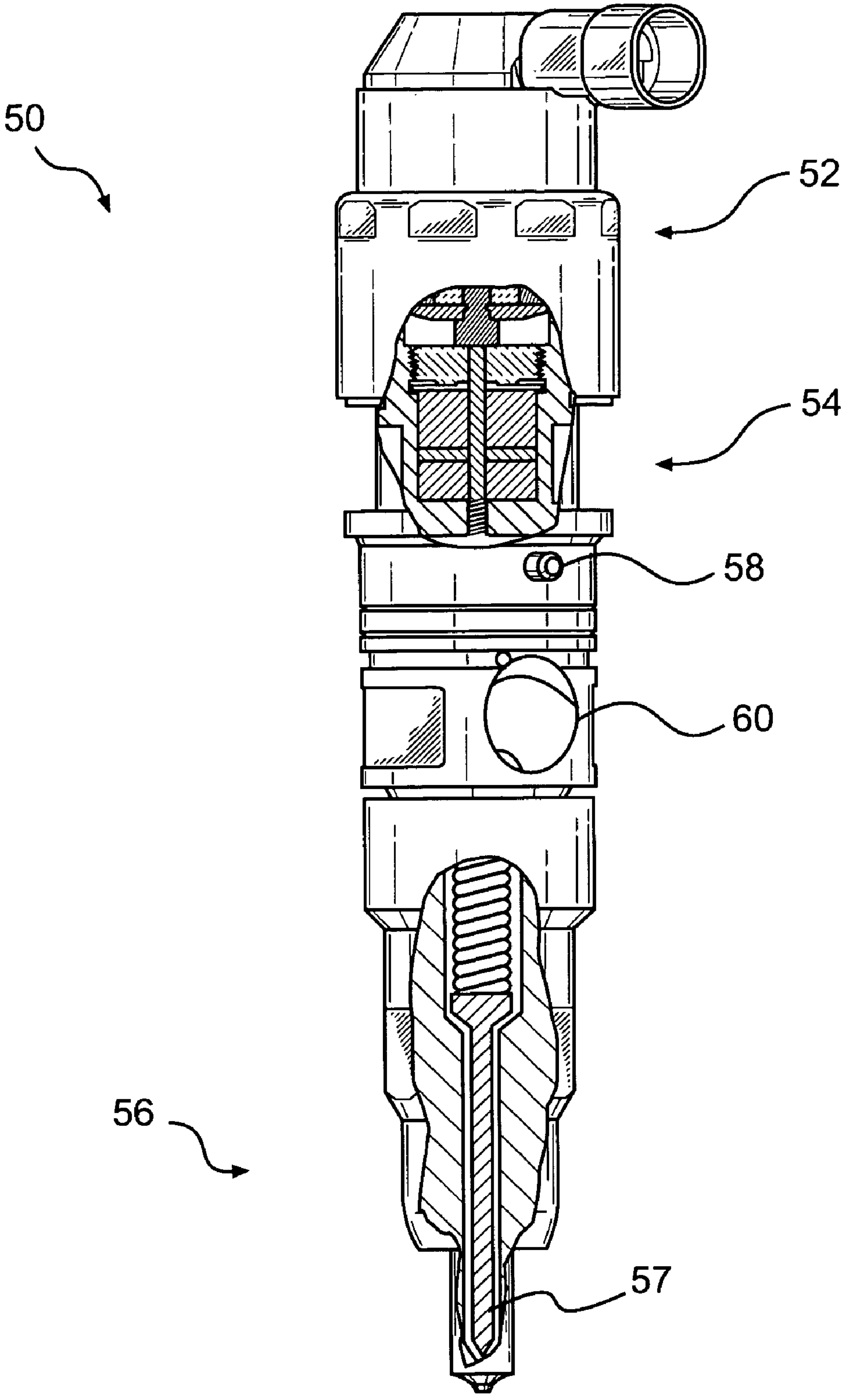
FIG. 1 is a pictorial illustration of an exemplary disclosed fuel injector.

As illustrated in FIG. 1, each fuel injector 50 may include a solenoid assembly 52, a valve assembly 54, a nozzle assembly 56, an alignment pin 58, and a quill cone 60. Solenoid assembly 52 may be any suitable solenoid actuator known in the art for actuating valve assembly 54. Solenoid assembly 52 may energize to displace components of valve assembly 54. In an alternative embodiment, any other suitable actuator such as, for example, a piezo actuator may be used to actuate valve assembly 54. Nozzle assembly 56 may include a needle check valve 57 configured to block and unblock fuel flow from fuel injector 50 into the combustion chamber. Alignment pin 58 may serve to align fuel injector 50 when it is inserted into the cylinder head. Quill cone 60 may be configured to receive a fuel quill for receiving fuel.

Figure 2:
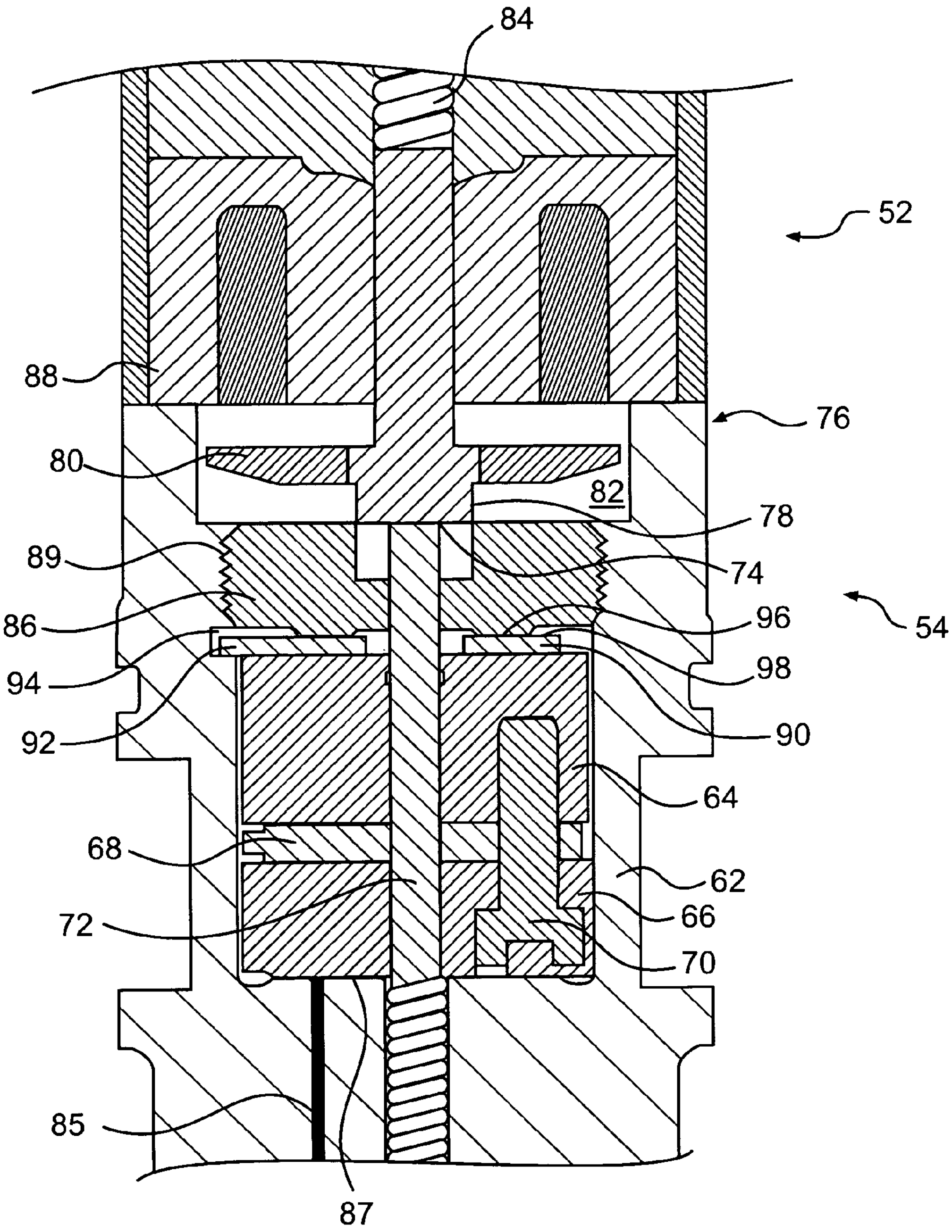
FIG. 2 is a cross-section illustration of the fuel injector of FIG. 1.

As illustrated in FIG. 2, a housing 62 of fuel injector 50 may be configured to receive valve assembly 54. Valve assembly 54 may include valve-supporting elements such as a first plate 64, a second plate 66, a shim 68, one or more fasteners 70, and a valve 72. First plate 64, second plate 66, and shim 68 may be configured to support valve 72 within housing 62. First plate 64, second plate 66, and shim 68 may include bores aligned in a longitudinal direction of fuel injector 50 and may be configured to allow valve 72 to pass through plates 64 and 66 and shim 68. First plate 64, second plate 66, and shim 68 may be dimensioned to fit snugly within housing 62, substantially preventing displacement of valve 72 in directions other than a longitudinal direction of fuel injector 50. Valve assembly 54 may also include guides (not shown) to maintain the longitudinal alignment of valve 72. A thickness of shim 68 may be varied to ensure a snug fit in a longitudinal direction of fuel injector 50 of valve assembly 54 within housing 62. Plates 64 and 66 and shim 68 may also include bores for receiving one or more fasteners 70. Fastener 70 may be any suitable fastener in the art such as, for example, a screw. An end of each fastener 70 may be attached to housing 62 so that one or more fasteners 70 may retain plates 64 and 66 and shim 68 within housing 62. Plates 64 and 66 and shim 68 may also include fuel drain lines in fluid connection with a drain line 85 of fuel injector 50. It is contemplated that valve assembly 54 may block and unblock flow through fuel drain line 85, thereby affecting a displacement of needle check valve 57 of nozzle assembly 56 to affect fuel injection as described below.

An end 74 of valve 72 may be connected to armature assembly 76 via a bolt 78. Armature assembly 76 may include an armature 80 disposed within a recess 82 of housing 62. Armature 80 may include a bore and may be attached to bolt 78 via the bore. Bolt 78 may be operably connected to solenoid assembly 52 so that solenoid assembly 52 may displace armature assembly 76 within recess 82 in a longitudinal direction of fuel injector 50. Because bolt 78 may be connected to valve 72, a displacement of armature assembly 76 may cause a longitudinal displacement of valve 72 within fuel injector 50. A spring 84 may apply a force to bias armature assembly 76 in a first position, where armature 80 bears against a load screw 86. Load screw 86 may include a recess configured to receive bolt 78 when armature 80 is in the first position.

Solenoid assembly 52 may energize to overcome the bias of spring 84 and cause armature 80 to displace from the first position to a second position within recess 82. In the second position, armature 80 may bear against a solenoid housing 88 of solenoid assembly 52. When armature 80 is in the first position, valve 72 may block drainage of fuel through valve assembly 54. This blockage may cause an area of nozzle assembly 56 above needle check valve 57 to be pressurized, affecting needle check valve 57 to be urged against a valve seat of nozzle assembly 56, effectively blocking the flow of fuel from fuel injector 50 into the combustion chamber. When armature 80 is in the second position, valve 72 may allow the drainage of fuel through valve assembly 54. Allowing fuel to drain may cause an area of nozzle assembly 56 above needle check valve 57 to decrease to a pressure less than a pressure of an area of nozzle assembly 56 below needle check valve 57. The pressure differential may cause needle check valve 57 to be urged away from the valve seat of nozzle assembly 56 and effectively allow the flow of fuel from fuel injector 50 into the combustion chamber. The displacements of armature assembly 76 and valve assembly 54 caused by solenoid assembly 52 may be relatively small such as, for example, 22 μm or less. It is contemplated that solenoid assembly 52, valve assembly 54, and armature assembly 76 may cooperate with needle check valve 57 of nozzle assembly 56 to block and unblock fuel flow into the combustion chamber.

Load screw 86 may serve to secure valve assembly 54 by tightening plates 64 and 66 and shim 68 against an end 87 of housing 62. Load screw 86 may include a bore configured to allow valve 72 to pass through load screw 86. An outside surface of load screw 86 may include threading 89 that may be received by threading of an interior surface of housing 62. Load screw 86 may be torqued by any suitable tool known in the art, threading load screw 86 into housing 62 and thereby tightening first plate 64, shim 68, and second plate 66 against each other and end 87. A washer 90 may be associated with load screw 86 and may be disposed between load screw 86 and first plate 64.

Washer 90 may be a tab washer. Washer 90 may include a projection such as tab 92 that may be integral with washer 90. A recess 94 may be disposed within an interior wall of housing 62 and may be configured to receive tab 92. Tab 92 may protrude from a side of washer 90 and may have a slightly curved end configured to correspond to a curvature of housing 62, so that tab 92 may fit within recess 94. Recess 94 may be large enough to allow tab 92 to displace within recess 94 in a longitudinal and transverse circumferential direction of fuel injector 50. In an exemplary embodiment provided as an illustration and not as a limitation, recess 94 may have a depth extending into housing 62 of 1.75±0.3 mm, a width extending in a transverse direction of fuel injector 50 of 4.00±0.5 mm, and a height extending in a longitudinal direction of fuel injector 50 of 2.00±0.3 mm.

Figure 3:
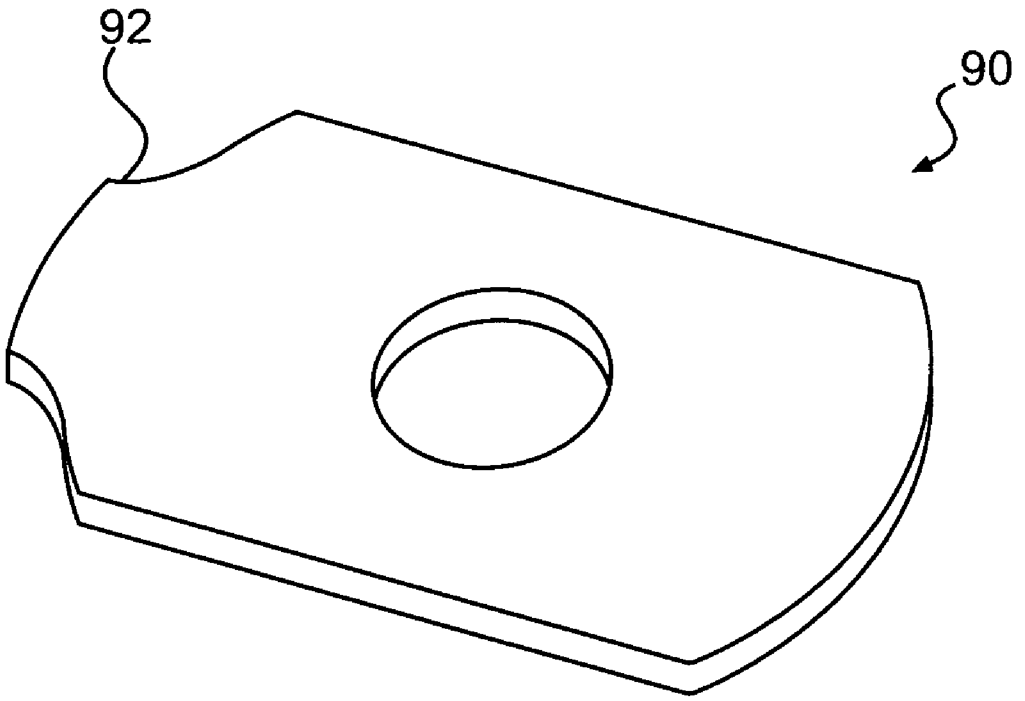
FIG. 3 is a pictorial illustration of an exemplary disclosed tab washer of the fuel injector of FIG. 1.

As illustrated in FIG. 3, washer 90 may be substantially rectangular. Washer 90 may also be square, circular, or oval in shape. A surface 96 of load screw 86 may abut a surface 98 of washer 90, and both surfaces may be smooth to reduce friction between surfaces 96 and 98. Tab 92 may be configured to engage recess 94 to transfer forces between load screw 86 and housing 62. Tab 92 may be initially inserted into recess 94 so that no side of tab 92 contacts a side of recess 94. As load screw 86 is tightened, the torquing force may twist washer 90 so that tab 92 displaces transversely within recess 94. A side of tab 92 may engage a side of recess 94, substantially preventing further twisting of washer 90 and transferring additional torque as a bearing force between tab 92 and recess 94. It is contemplated that washer 90 may transfer torque forces due to tightening load screw 86 into housing 62 via tab 92 and recess 94 to prevent and/or reduce the torque from twisting and thereby misaligning first plate 64 relative to second plate 66.

INDUSTRIAL APPLICABILITY

Fuel injector 50 may provide a method for maintaining the alignment of valve assembly 54. During torquing to secure valve assembly 54 within fuel injector 50, washer 90 may transfer torque via tab 92 and recess 94 of housing 62, thereby reducing and/or preventing misalignment of valve assembly 54. Additionally, the alignment of fuel injector 50 may be maintained without the need for lubrication that may mix with fuel and cause an engine to malfunction.

Plates 64 and 66 and shim 68 of valve assembly 54 may be disposed within housing 62 of fuel injector 50. Washer 90 may be disposed between first plate 64 and load screw 86. Tab 92 of washer 90 may be inserted into recess 94 of housing 62. Torque may be applied to load screw 86 by threading load screw 86 into the threading on the interior surface of housing 62. As load screw 86 is threaded into housing 62, load screw 86 may displace toward washer 90 and may bias plates 64 and 66 and shim 68 against end 87 and into a relatively tight fit within housing 62. As torque is applied to thread load screw 86 into housing 62, the torque may cause washer 90 to twist. As washer 90 twists, tab 92 may displace within recess 94 so that a side of tab 92 engages a side of recess 94, thereby transferring torque to housing 62 via tab 92 and recess 94. Because torque may be transferred to housing 62 via washer 90, instead of to first plate 64, twisting and misalignment of first plate 64 relative to shim 68 and second plate 66 may be reduced and/or prevented.

Because valve assembly 54 may be securely fastened within housing 62 via appropriate torquing of load screw 86, while not causing misalignment, fuel injector 50 may properly operate to provide fuel to the combustion chamber. Proper alignment may allow valve 72 to block and unblock fuel drainage through valve assembly 54, thereby affecting a displacement of needle check valve 57 of nozzle assembly 56 and allowing fuel injection into the combustion chamber.

It will be apparent to those skilled in the art that various modifications and variations can be made to the disclosed valve assembly. Other embodiments will be apparent to those skilled in the art from consideration of the specification and practice of the disclosed method and apparatus. It is intended that the specification and examples be considered as exemplary only, with a true scope being indicated by the following claims and their equivalents.

What is claimed is:

1. A valve assembly, comprising:

a housing having a first recess disposed on an interior surface of the housing;

at least one valve-supporting element disposed within the housing;

a washer disposed within the housing, the washer having a first washer surface and a projection for transferring torque, the first washer surface abutting against a first valve-supporting element surface of the at least one valve-supporting element and the projection being received in the first recess, wherein the at least one valve-supporting element and the washer each include a bore, the bores being substantially aligned when the at least one valve-supporting element and the washer are disposed in the housing;

a valve received within the bores;

an armature disposed on a bolt, the armature configured to affect movement of the valve between a first and a second position; and a first fastener disposed within the housing and having a first fastener surface abutting against a second washer surface of the washer, wherein the bolt and the armature displace within a second recess formed within the housing, the first fastener receiving the bolt when the valve is moved from the second position to the first position.

2. The valve assembly of claim 1, wherein the washer transfers torque from the first fastener to the housing via an engagement of the projection against an interior surface of the first recess when the first fastener is tightened.

3. The valve assembly of claim 1, wherein the projection is configured to displace in a direction longitudinal and a direction transverse of the valve assembly.

4. The valve assembly of claim 1, wherein the projection displaces in a direction transverse of the valve assembly until a surface of the projection engages a surface of the first recess when the first fastener is tightened.

5. The valve assembly of claim 1, wherein the washer is substantially rectangular in shape.

6. The valve assembly of claim 1, wherein an end of the projection is substantially curved to correspond to a curvature of the housing.

7. The valve assembly of claim 1, wherein the valve supporting element includes a first plate and a second plate, the first plate being parallel to the second plate.

8. The valve assembly of claim 7, wherein a shim is located between the first plate and the second plate.

9. The valve assembly of claim 8, wherein a second fastener couples the first plate to the second plate.

10. The valve assembly of claim 9, wherein the second fastener is parallel to the valve.

11. The valve assembly of claim 1, wherein the first fastener includes exterior threads that are threadably received by the housing.

12. The valve assembly of claim 1, wherein a spring is disposed at an end of the bolt.

13. The valve assembly of claim 6, wherein an end of the washer opposite the end of the washer having the projection is also curved.

14. The valve assembly of claim 1, wherein the first fastener receives the bolt within an opening in the first fastener.

15. The valve assembly of claim 1, wherein the projection of the washer projects from a side of the washer.

16. The valve assembly of claim 1, wherein the first washer surface and the second washer surface are flat.

17. A valve assembly, comprising:

a housing having a first recess disposed on an interior surface of the housing;

at least one valve-supporting element disposed within the housing;

a washer disposed within the housing, the washer having a first washer surface and a projection for transferring torque, the first washer surface abutting against a first valve-supporting element surface of the at least one valve-supporting element and the projection being received in the first recess, wherein the at least one valve-supporting element and the washer each include a bore, the bores being substantially aligned when the at least one valve-supporting element and the washer are disposed in the housing;

a valve received within the bores;

an armature disposed on a bolt, the armature configured to affect movement of the valve between a first and a second position; and a first fastener disposed within the housing and having a first fastener surface abutting against a second washer surface of the washer, wherein the bolt and the armature displace within a second recess formed within the housing, the first fastener receiving the bolt when the valve is moved from the second position to the first position, wherein the washer transfers torque from the first fastener to the housing via an engagement of the projection against an interior surface of the first recess when the first fastener is tightened.

18. A valve assembly, comprising:

a housing having a first recess disposed on an interior surface of the housing;

at least one valve-supporting element disposed within the housing;

a washer disposed within the housing, the washer having a first washer surface and a projection for transferring torque, the first washer surface abutting against a first valve-supporting element surface of the at least one valve-supporting element and the projection being received in the first recess, wherein the at least one valve-supporting element and the washer each include a bore, the bores being substantially aligned when the at least one valve-supporting element and the washer are disposed in the housing;

a valve received within the bores;

an armature disposed on a bolt, the armature configured to affect movement of the valve between a first and a second position; and a first fastener disposed within the housing and having a first fastener surface abutting against a second washer surface of the washer, wherein the bolt and the armature displace within a second recess formed within the housing, the first fastener receiving the bolt when the valve is moved from the second position to the first position, wherein the projection displaces in a direction transverse of the valve assembly until a surface of the projection engages a surface of the first recess when the first fastener is tightened.

* * * * *